UNITED STATES PATENT OFFICE.

WALTER ALEXANDER, OF NEW YORK, N. Y.

PAINT-REMOVER.

1,143,878. 	Specification of Letters Patent. 	Patented June 22, 1915.

No Drawing. 	Application filed February 23, 1910. Serial No. 545,265.

*To all whom it may concern:*

Be it known that I, WALTER ALEXANDER, a citizen of the United States of America, and a resident of the city of New York, State of New York, borough of Manhattan, have invented certain new and useful Improvements in Paint-Removers, of which the following is an exact description.

Hitherto two classes of paint removers have been generally employed. The older class of removers contained alkaline agents and other powerful chemicals, which caused injury both to the operator and to the material on which the remover was used. The newer type of remover consisted generally of organic solvents to which a solid waxy or oily substance was added to prevent the rapid flowing off from inclined surfaces. As these solvents are mostly very volatile they evaporate so quickly that they do not remain in contact long enough with the surface to be treated to do efficiently the work for which they are intended.

I have now found that if I employ a skin-forming remover, I am able to prevent evaporation of the solvents and keep the solvents in contact with the surfaces to be treated so long that the removal of paint, varnish, lac or the like is accomplished most thoroughly. The formation of the skin in my new compound is brought about by the employment of a solution of a cellulose ester, such as nitro cellulose, or acetylcellulose in a suitable organic solvent, such as acetone or what is commercially known as methylacetone, mixed with water.

As such a solution of a cellulose ester in organic solution leaves behind a hard skin or film upon evaporation of the solvent, I prevent this hard drying by the addition of water, or preferably, an aqueous solution of a carbohydrate such as glucose. To these two solutions, that of the cellulose esters in an organic solvent and that of the carbohydrate in water, I may add other materials which have been hitherto generally employed as paint and varnish removers; and for the water or the aqueous solution of a carbohydrate I may substitute benzol, which although precipitating nitro cellulose does not interfere with formation of the skin in my new remover. Water may then again be added after the benzol, and the mixture thus obtained still retains its usefulness as a skinforming remover.

In carrying out my invention practically, I proceed as follows: I first dissolve five parts of commercial glucose in five parts of water; to this solution I add seventy parts of a nitro cellulose solution, made by dissolving ten parts of nitro cellulose in ninety parts of acetone; then I add twenty parts of paint solvents, for example coaltarbenzole, and finally fifteen parts of water. The thus obtained liquid is applied with a brush or rag on the surfaces to be treated. By the skin which is quickly formed, the solvents are prevented from evaporating uselessly into the air and are forced to remain in contact with the painted surface. By this lessened evaporation and prevention of loss of solvent great economy is accomplished and great convenience in working is brought about, as the operator can take his time in applying the remover and in cleaning off the treated surfaces.

Although I have above described an example by which my new skin forming paint remover may be obtained, I do not wish to be understood as excluding from my claim equivalents for the ingredients or the operations employed in the process. This paint remover possesses among other features of advantage the applicability alike to the removal either of oil or water paints, or both, where one overlies the other, or to the removal of varnish or lacquer. Substitutes may be employed without departing from the scope and purpose of the process intended to be secured hereby.

I claim:

1. A new skin-forming paint remover for both oil and water paints comprising a solution of a cellulose ester in a suitable organic solvent, said solution being of film-forming consistency, an aqueous liquid emulsified therewith and organic paint solvents, said cellulose ester solution remaining of film-forming consistency, and the skin-forming properties of the paint remover being due to said film-forming solution.

2. A new skin-forming paint remover for both oil and water paints comprising about 70 parts of a solution of 1 part of nitrocellulose in about 9 parts of a suitable organic solvent, about 25 parts of an aqueous liquid, and about 20 parts of an organic paint solvent.

3. A new skin-forming paint remover for both oil and water paints comprising a mixture of the following ingredients in about the following proportions,—5 parts glucose dissolved in 5 parts water, 70 parts of a nitrocellulose solution made by dissolving 10 parts nitrocellulose in 90 parts of acetone, 20 parts of coaltar benzene and 15 parts of water.

4. The new skin forming paint remover comprising a cellulose ester dissolved in a suitable organic solvent, a carbohydrate dissolved in water, and organic paint solvents.

5. The new skin forming paint remover comprising nitro cellulose dissolved in a suitable organic solvent, a carbohydrate dissolved in water, and organic paint solvents.

6. The new skin forming paint remover comprising a cellulose ester dissolved in a suitable organic solvent, glucose dissolved in water, and organic paint solvents.

7. The new skin forming paint remover comprising nitro cellulose dissolved in a suitable organic solvent, glucose dissolved in water, and organic paint solvents.

8. The new skin forming paint remover comprising nitro cellulose dissolved in acetone, glucose dissolved in water, and paint solvents.

WALTER ALEXANDER.

Witnesses:
ELIZABETH J. VAIL,
SEWARD DAVIS.